Sept. 13, 1932.    G. M. CROSS    1,876,862
SPRING REACTION NEUTRALIZER
Filed July 30, 1927    2 Sheets-Sheet 1
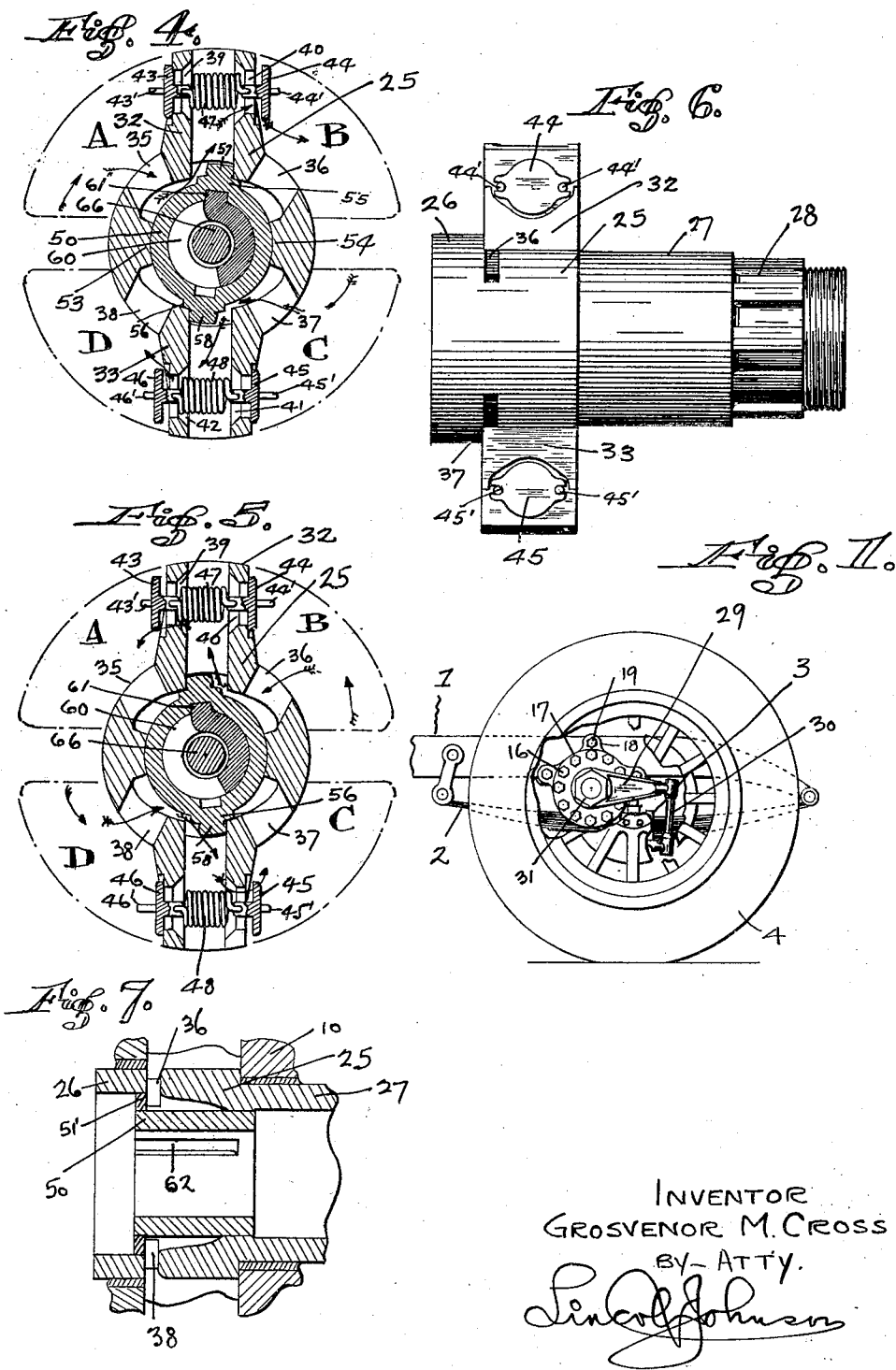

Sept. 13, 1932. G. M. CROSS 1,876,862
SPRING REACTION NEUTRALIZER
Filed July 30, 1927 2 Sheets-Sheet 2
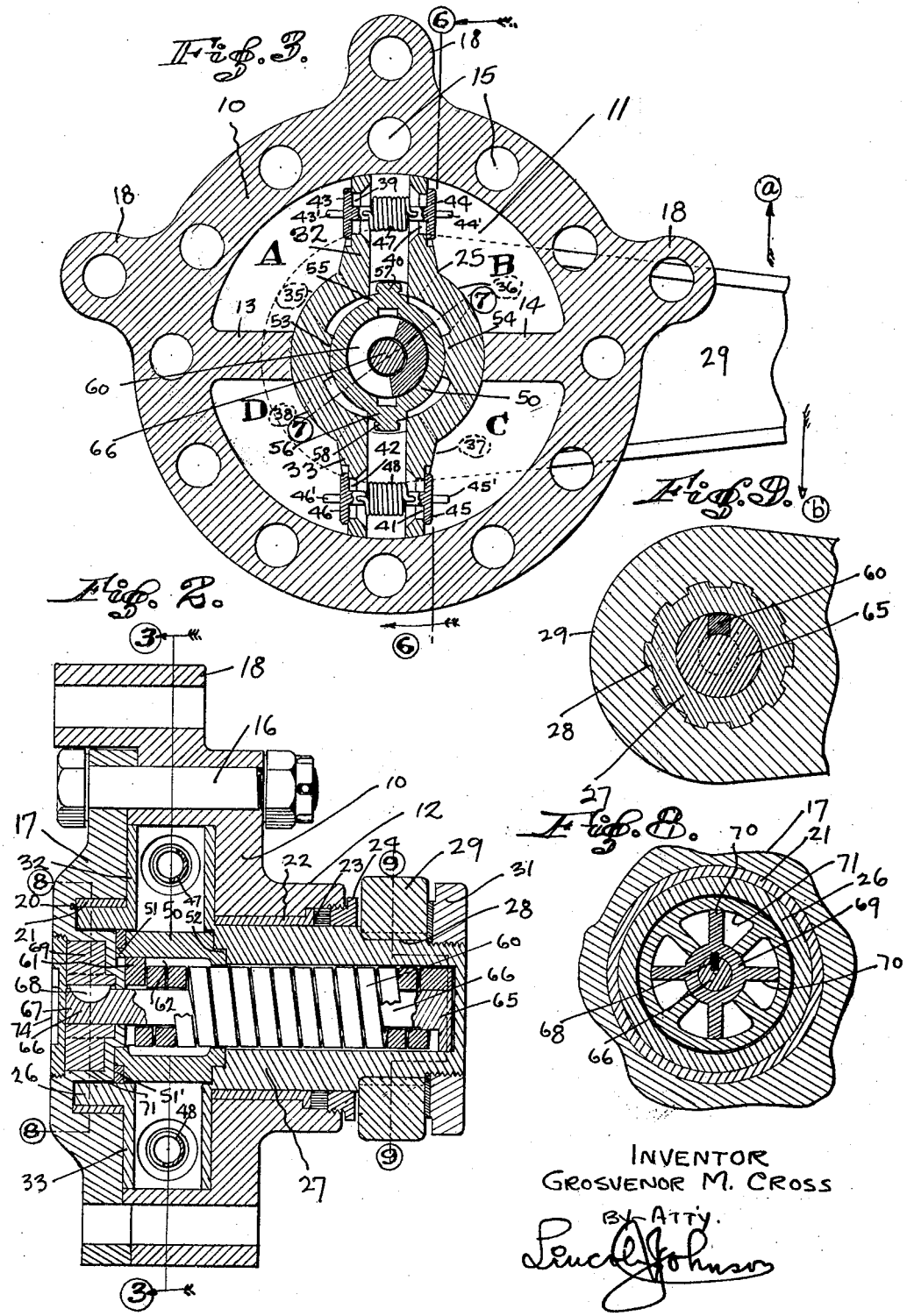
INVENTOR
GROSVENOR M. CROSS
BY ATTY.
Lincoln Johnson Patented Sept. 13, 1932

1,876,862

UNITED STATES PATENT OFFICE

GROSVENOR M. CROSS, OF BELVEDERE, CALIFORNIA

SPRING REACTION NEUTRALIZER

Application filed July 30, 1927. Serial No. 209,595.

This invention relates particularly to an improved form of shock absorbing device for vehicles and the like.

An object of the invention is to provide a device for use on vehicles, such as automobiles, to neutralize the reactive stress of the springs after compression or expansion thereof, caused by an irregular road surface, to prevent shocks or jolts being transmitted to the vehicle and its occupants.

A further object of the invention is to provide a device for neutralizing vehicle spring stress, designed and constructed, to neutralize or offset the reaction resulting from the increased or decreased stress in the vehicle springs as said vehicle passes over a rough roadway, whereby the line of the vehicle travel will be substantially free from sudden rises or drops, to insure smooth riding to the vehicle.

A still further object of the invention is to provide a shock absorbing device having means within it for automatically adjusting itself to load variations, thereby causing it to function equally well whether the vehicle is carrying a light or heavy load.

Other objects of the invention are to provide a spring reaction neutralizer or shock absorber that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings

Fig. 1 is a side elevation of a fragmentary part of a conventional vehicle, together with its running gear, having a spring reaction neutralizer, constructed in accordance with my invention, operatively connected to the vehicle and to the running gear.

Fig. 2 is an enlarged longitudinal section taken through my spring reaction neutralizer.

Fig. 3 is a section taken through Fig. 2 on the line 3—3, showing the fluid by-pass valve in a closed position.

Fig. 4 is a section similar to Fig. 3 showing the fluid by-pass valves in one open position.

Fig. 5 is a section similar to Fig. 3 showing the fluid by-pass valves in an opposite open position.

Fig. 6 is a view taken on the line 6—6 of Fig. 3 to show the rotor in elevation.

Fig. 7 is a section taken through Fig. 3 on the line 7—7.

Fig. 8 is a section taken through Fig. 2 on the line 8—8.

Fig. 9 is a section taken through Fig. 2 on the line 9—9.

In detail, the construction illustrated in the drawings comprise an automobile body or chassis or any two movable bodies of which a fragmentary portion is shown, consisting of a side frame member 1, spring 2, pivotally and flexibly connected at its opposite ends to the frame 1, and axle 3 secured to the spring 2, and the usual wheels 4 rotatably mounted on the ends of the axle. My spring stress neutralizing device is secured to the vehicle frame 1 and is provided with a swinging lever and link connection by which it is connected to the axle 3. My invention comprises a yielding connection between the axle and body, and combines means for neutralizing the reaction of the force or stress in said yielding connection by means of an opposing force equal at all points to the difference between the force or stress in said yielding connection and its normal force or stress.

The spring reaction neutralizer consists of a stator, or casing 10, having a circular compartment 11 formed therein. One side of the casing 10 is provided with a hub bearing 12 extended therefrom concentrically with the axis of the compartment 11. The compartment 11 is provided with a pair of partitions 13 and 14 extended therein from diametrically opposite sides to form fluid barriers and also a supporting bearing for the rotor, to be hereinafter described. The rim of the casing 10 is drilled with bolt holes 15 through which bolts 16 may be passed to secure a cover plate 17 over the open side of the casing 10 and compartment 11. The extreme upper edge of the casing 10 is provided with lug projections 18 thereon through which bolts 19 are passed to secure the casing 10 to the frame 1 of the vehicle body, as shown in Fig. 1. Although I have shown and described a particular form of connection for joining the casing 10 onto the side frame 1, it is to be understood that any other form of connecting means might be substituted in lieu thereof.

The inside face of the cover 17, facing the compartment 1, is recessed to provide a ring-like groove 20, that is concentric with the axis of the compartment. The groove 20 is lined with a metal bushing 21. A bushing 22 is mounted in the hub bearing 12, and said bushing 22 is held in place by the packing 23, and a packing gland 24, arranged adjacent the outer end of the hub bearing 12.

A rotor 25 is rotatably mounted within the compartment 11, and said rotor has an outer diameter slightly less than the distance between the partitions 13 and 14, that are extended into the compartment 11. The word "rotor" is used here in a broad way, inasmuch as the part termed "rotor" does not at any time turn a complete revolution. The side of the rotor 25, facing the cover 17, is provided with a ring like shoulder 26 thereon that is rotatably journaled in the bushed groove 20 formed in the said cover 17. The opposite side of the rotor 25 is provided with a hollow shaft 27 thereon that is rotatably journaled in the bushed bearing 12. The hollow shaft 27 extends beyond the end of the packing gland 24 and is reduced in diameter and splined at 28. A lever 29 has an end thereof splined to engage the splined end 28 of the hollow shaft 27, and the free end of said lever 29 is pivotally connected by a link 30 to the axle 3 of the vehicle. A nut 31 is threaded onto the end of the hollow shaft 27 to hold the arm 29 in fixed position on said shaft. The lever 29 moves relative to the casing and hence causes the rotor 25 to be moved within the casing.

The rotor 25, within the compartment 11, is provided with peripheral projections 32 and 33 on diametrically opposite sides thereof. The ends of the projections 32 and 33 are faced off to engage the inner circumference of the compartment 11 and enjoy a sliding fit engagement therewith. Each of the projections 32 and 33 is provided with a rectangular opening therethrough communicating the ends of each of said projections with the hollow interior of the rotor. The partitions 13 and 14 divide the compartment 11 into a pair of semicircular chambers, while the rotor projections 32 and 33 are arranged in the compartment 11 at right angles to the partitions 13 and 14 to divide the pair of semicircular chambers into segmental chambers A, B, C and D. The entire interior of the casing, including the interior of the hollow rotor, is filled with a fluid, such as oil. In operation, the oil or fluid that is contained in the chamber A is adapted to be by-passed into the chamber B, or by-passed from the chamber B to the chamber A. Similarly, oil is adapted to be by-passed from the chamber C to the chamber D, or vice versa.

The rotor 25 is provided with a plurality of circumferentially disposed ports there-around, to communicate the hollow interior of said rotor with each of the chambers A, B, C and D. The port 35 in the rotor communicates with the chamber A, the port 36 with the chamber B, the port 37 with the chamber C, and the port 38 with the chamber D. Fluid entering the hollow interior of the rotor projection 32 can enter either of the chambers A or B, through valve ports 39 and 40, respectively, arranged on the opposite faces of the projection 32. In a similar manner, fluid that enters the hollow interior of the projection 33, can pass into either of the chambers C or D, through valve ports 41 and 42 arranged on opposite faces of the projection 33.

A valve plate 43 covers the valve port 39 and can be opened outwardly relative thereto, being slidably mounted on valve guides 43'. Similar valve plates 44, 45 and 46 are arranged over the other valve ports 40, 41 and 42, and may be moved outwardly relative thereto. The valve plate 44 is slidably mounted on valve guides 44', the plate 45 is slidably mounted on valve guides 45', and the valve plate 46 is slidably mounted on valve guides 46'. The pair of valve plates 43 and 44 are held in closed position over the valve ports 39 and 40 by a tension spring 47, and the valve plates 45 and 46 are held together in seated position by a tension spring 48. Any one of the valves 39, 40, 41 and 42 may be opened outwardly by fluid pressure applied to the inside face thereof to overcome the tension of the springs 47 and 48.

A circular valve 50, with annular shoulders 51 and 52 on its opposite sides, is rotatably journaled within the rotor 25 in registry with the center ports in the projections 32 and 33. Bearings 53 and 54 are formed on the inner circumference of the rotor 25 to support the exterior of the circular valve 50 and form a bearing support therefor, in addition to the end bearings 51 and 52. The exterior of the valve 50, on diametrically opposite sides thereof, is provided with projecting shoulders 55 and 56, each of which are adapted to register with the hollow center of each of the rotor projections 32 and 33. A ring 51' is mounted in the shoulder 26 to form a journal for the valve bearing 51. The projection 55 is provided with a stop 57 thereon extended within the hollow center of the rotor projection 32, to limit rotative movement of the valve 50 relative to the rotor 25, and a similar stop 58 is provided on the projection 56 extending within the hollow interior of the rotor projection 33 to limit the rotative movement of the valve 50 relative to said rotor. The cross sectional area of each of the valve shoulder projections 55 and 56 is substantially the same as the cross sectional area of the hollow interior of each of the rotor projections 32 and 33.

In the operation of the invention as will be hereinafter described, the valve 50 is adapted to be partially rotated within the rotor, as shown in Figs. 4 and 5, so that fluid may be passed, according to the operation of the device, from any of the ports 35, 36, 37 and 38, by the shoulders 55 or 56 on the valve 50 into the hollow interior of the rotor projections 32 and 33, respectively. The interior of the rotor 25 adjacent the various ports 35, 36, 37 and 38, is recessed to provide an unrestricted passage through which fluid, entering from any of the ports 35, 36, 37 and 38, may pass the shoulders on the valve 50 and enter the rotor extensions 32 and 33. The valve 50 is arranged to occupy a neutral position within the rotor, so that fluid will not pass from the chamber A into the chamber B or vice versa, or from the chamber C into the chamber D, or vice versa, except when relative movement between the axle and vehicle body takes place to build a greater pressure of fluid on one side of the rotor than the other, which will cause the valve 50 to be turned to relieve said pressure.

The valve 50 is maintained towards the neutral position as shown in Fig. 3 by means of a coil spring 60 which has one end thereof 61 turned up and outward to engage a groove or slot 62 formed in the inner circumference of the valve 50. The opposite end of the spring 60 engages a slot in the head 65 of a shaft 66 that passes centrally through the coil spring 60. The opposite end 67 of the shaft 66 is keyed at 68 into a spider 69, which has arms 70 extended radially therefrom. The spider 69 is rotatably confined within a fluid filled cylinder 71, having baffles therein, formed centrally within the outer face of the cover 17. The engagement between the spider arms 70 and the baffles in the cylinder 71 is free enough to permit a restricted passage of fluid throughout the entire interior thereof. The fluid contained within the cylinder 71 between the baffles therein and the arms on the spider 69 automatically regulates the position of the valve 50 within the rotor to compensate for light or heavy loads carried by the vehicle. The outer face of the spider 69 is closed by a cap 74.

The operation of my device is as follows. In discussing the operation of this neutralizer, the method of attachment in Figs. 1 and 3, shows the apparatus in a neutral position, wherein the vehicle body is at its normal distance above the vehicle axle, the spring 60 being unstressed to center the valve 50 in its neutral position, as shown in Fig. 3, and the fluid pressure in the chambers A, B, C, and D is the same. Between the chambers A and B of the casing 10 lies the rotor projection 32 containing the circular valve member 50 and the plate valves 43 and 44. Each and every one of these valves affects, and is affected by, whatever difference in fluid pressure may exist between the two chambers A and B or vice versa. The valve construction on the other half of the rotor 25 being the same, it is obvious that the valve 50 and the plate valves 45 and 46 therein affects and will be affected by, whatever difference in pressure may exist between the two chambers C and D, or vice versa. The operation that takes place between the chambers A and B, or B and A, will be identical with the operation that takes place between the chambers C and D, or D and C, so that the operation of only one-half of the apparatus will be entered into herein, and it is to be assumed that the other half of the device will operate in identically the same manner.

With all parts of the apparatus in the neutral position as shown in Fig. 3, the opposite shoulders 55 and 56 on the central valve 50 form, in effect, a gate to close the passage of fluid from chamber A into B, or C into D and vice versa. An obstruction striking the wheel 4 and causing it to lift, or a force causing the body to lower out of its normal line of travel, creates relative movement between the casing 10 and lever 29 and causes the lever 29 of my neutralizing device to be raised upward in the direction of the arrow "a", as shown in Fig. 3, and the rotor projections 32 and 33 to be turned toward the fluid in the chambers A and C. This creates pressure in the chambers, which, acting on the shoulders 55 and 56 of the valve 50, causes this valve to rotate as indicated in Fig. 4, thus opening the passages from the chambers A and C into the interior of the projections 32 and 33. As the pressures in chambers B and D are less than that in chambers A and C, and in the hollow projections 32 and 33, valves 44 and 46 are opened against the light tension of springs 47 and 48, thus allowing fluid to pass completely from chambers A and C into the chambers B and D. As the movement of the rotor continues, the valve 50 is held more and more firmly in the position indicated in Fig. 4, by the tension of the spring 60, which tends to keep the valve centered and fluid will pass the shoulders 55 and 56 unimpeded, thus allowing the axle to rise towards the body freely.

When the force tending to move the body and axle together ceases, the vehicle spring, having been compressed, tends to expand again, pulling the lever 29 in the direction indicated by the arrow "b" in Fig. 3. This creates pressure in chambers B and D which must be of a certain value before the valve 50 can be moved in the opposite direction as in Fig. 5, and return movement allowed, by the reverse by-passing of fluid, as indicated in Fig. 5. Valve 50 is held as in Fig. 4 by the tension of spring 60, as already described, and the area of the shoulders 55 and 56 exposed to fluid pressure, and also the strength of spring 60, are so calculated, for each particular vehicle, that the back pressure in chambers B and D necessary to open the valve and permit return movement, will, when transmitted to the axle by the arms 32 and 33, rotor 25 and lever 29, exactly equal, at all times, the amount by which the pressure of the vehicle springs is greater than normal.

The action of the rotor and valves in the opposite direction from normal, when external forces cause the body and axle to separate and the vehicle spring to expand, is exactly similar to that heretofore described. In this case, valve 50 takes an opposite position during the initial movement, as in Fig. 5, and free movement is allowed, valve 50 being held more and more tightly in the position allowing such movement by the tension of the spring 60, as the movement progresses. When the spring tends to come together again, due to the loss in pressure, which is due to expansion, pressure will be developed in the chambers A and C, which, in order to open valve 50 and allow return movement, must be of a value which, transmitted through the rotor projections 32 and 33, rotor 25 and lever 29, will exert a separating force across the spring, between the body and axle, exactly equal at all times to the difference between the pressure of the vehicle spring and its normal pressure.

It is obvious that the movement of the rotor 25 and the circular valve 50 can be effected either by movement of the arm 29, resulting from upward or downward movement of the axle below its normal line of travel, or from movement of the vehicle, above or below its normal line of travel. In either case, the action of the mechanism is identical for neutralizing or offsetting the recoil of the increased or decreased stress of the vehicle springs.

In order that the cushioning apparatus will automatically adjust itself to load variations, thereby causing it to function equally well whether the vehicle is carrying a light or a heavy load, I provide the spider structure 69 on an end of the shaft to which the end of the coil spring 60 is connected. As heretofore described, the spider plate 69 is confined within the cylinder 71 and immersed in fluid. It is obvious that when the valve 50 is in a neutral position with reference to the rotor ports, the fluid pressure on opposite faces of the spider arms 70 will be equal and that this balanced fluid pressure on the spider arms will tend to hold the valve 50 in a centered position. A heavy load on the vehicle body will cause it to move below its normal level, and hence cause the rotor 25 and valve 50 to turn relative to the casing. Fluid will be displaced around the rotor so that the chambers on opposite sides of the rotor projections will hold different volumes of fluid, under the same pressure. The valve 50 will tend to remain open until such time as the fluid pressure on the spider 69 readjusts itself by automatically equalizing the pressure on opposite sides of the spider arms 70. The spider 69 is allowed to turn within its casing, but only very slowly, so that momentary changes of pressure will not affect it. When the average position of the valve 50 within the rotor is correct, the spring 60 will be flexed as much in one direction as in the other, and thus the average pressure on opposite faces of the spider arms will be the same, that is, the spider will momentarily be forced as much in one direction as in the other. When the normal average position of the rotor within the casing is altered by a change of load in the vehicle, the normal position of the vehicle will also be disturbed, and the spider will be forced more in one direction than in the other; fluid will slowly pass around the arms of the spider allowing the spider to turn in its housing, until the average of pressures on each side are equal and the valve is properly centered.

Having thus described this invention, what I claim and desire to secure by Letters Patent is:

1. A shock absorber for two spring-connected bodies which have a limited spring distorting movement toward and from each other comprising a piston chamber member and a rotary piston member therein in which all the wall surfaces with which the piston member is in slidable engagement are in fixed relation to each other and to the piston chamber member, the said piston member and piston chamber member being connected respectively to said bodies and acting to permit limited movement of the bodies away from a normal position either toward or from each other and to retard equally for equal extents of movement the return movement in either direction to said normal position, and means for adjusting the forces exerted between the two members to conform to changes in the normal position of said bodies with respect to each other.

2. A shock absorber for two spring-connected bodies which have a limited spring distorting movement toward and from each other comprising a piston chamber member and a rotary piston member therein in which all the wall surfaces with which the piston member is in slidable engagement are in fixed relation to each other and to the piston chamber member, the said piston member and piston chamber member being connected respectively to said bodies and acting to permit limited movement of the bodies away from a normal position either toward or from each other and to retard the return movement to said normal position, and means acting automatically upon a change in the normal position of said bodies with respect to each other to adjust the forces exerted between the two members to compensate for such change.

3. An apparatus to neutralize spring stresses comprising a fluid filled casing, a rotor in the casing acting in conjunction therewith to permit movement of the spring away from normal position and to retard its return thereto, a valve normally held in neutral position corresponding to the normal position of the spring and acting to control said retarding action, automatic load adjusting means to shift the neutral position of the valve in accordance with a change in the normal position of the spring due to a change in load thereon, the retarding action of said valve being in direct proportion to the angular deflection of the rotor with respect to the casing except as modified by the influence exerted thereon by said load adjusting means.

4. A shock absorber for vehicles having spring connected body and axle members, comprising a casing secured to one of the members, a rotor secured to the other member and acting in conjunction with said casing to permit limited motion of the vehicle spring away from normal position and to retard its return thereto, a valve normally held in a neutral position corresponding to the normal position of the vehicle spring acting to control said retarding action, automatic load adjusting means to shift the neutral position of the valve in accordance with a change in the normal position of the vehicle spring due to a change in load thereon, the retarding action of said valve being in direct proportion to the angular deflection of said rotor except as modified by the influence exerted by said load adjusting means thereon.

5. A shock absorber for vehicles having spring connected body and axle members comprising a casing secured to one of the members, a rotor mounted in said casing and connected to the other member and acting in conjunction with the casing to permit limited motion of the vehicle spring away from normal position and to retard its return thereto, a pressure actuated valve, a valve spring normally holding the valve in neutral position corresponding to the neutral position of the vehicle spring, said valve acting variably with the angular deflection of the rotor to neutralize the return of the vehicle spring to normal position, and load adjusting means acting to shift the valve to a new neutral position upon a change in load on the vehicle spring, comprising a dashpot having a fixed and movable member, the movable member of which establishes said neutral position of the valve without bodily moving said valve spring.

6. A shock absorber for vehicles having spring connected body and axle members comprising a casing connected to one of the members, a rotor mounted in the casing and connected to the other member, said rotor having pistons extending radially from its axis and acting in conjunction with said casing to permit movement of the vehicle spring away from normal position and to retard its return thereto, said pistons throughout their travel in the casing maintaining full contact with the walls thereof, a pressure actuated valve normally held in neutral position corresponding to the normal position of the vehicle spring and acting variably with the angular deflection of the rotor to neutralize the return of the vehicle spring to normal position, and automatic means to shift the valve into neutral position in accordance with a shift of the normal position of the vehicle spring due to a change in load thereon.

7. A shock absorber for vehicles having spring connected body and axle members comprising a casing connected to one of the members, a rotor in the casing and connected to the other member acting in conjunction with said casing to permit motion of the vehicle spring away from normal position and to retard its return thereto, a pressure actuated valve normally held in neutral position acting variably with the angular deflection of the rotor to control the return of the vehicle spring to normal position and load adjusting means acting by engagement with said valve alone to shift said neutral position of the valve to correspond with a new normal position of the vehicle spring due to a change in load thereon.

In testimony whereof, I have hereunto set my hand at San Francisco, California, this 23rd day of June, 1927.

GROSVENOR M. CROSS.